US010851916B2

(12) United States Patent
Vaccaro et al.

(10) Patent No.: US 10,851,916 B2
(45) Date of Patent: Dec. 1, 2020

(54) ADAPTER FOR MOUNTING CABLE HANGERS

(71) Applicant: CommScope Technologies LLC, Hickory, NC (US)

(72) Inventors: Ronald A. Vaccaro, Taylorsville, NC (US); Aviral Joshi, Chicago, IL (US); Christopher Stockman, Joliet, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/413,246

(22) Filed: May 15, 2019

(65) Prior Publication Data

US 2019/0383426 A1   Dec. 19, 2019

Related U.S. Application Data

(60) Provisional application No. 62/686,882, filed on Jun. 19, 2018.

(51) Int. Cl.
*F16L 3/00* (2006.01)
*H02G 3/00* (2006.01)
*F16B 21/08* (2006.01)

(52) U.S. Cl.
CPC .............. *F16L 3/00* (2013.01); *F16B 21/088* (2013.01); *H02G 3/26* (2013.01)

(58) Field of Classification Search
CPC . F16L 3/00; F16B 21/088; H02G 3/26; A63H 33/086; A63H 33/088
USPC ..... 248/49, 55, 58, 60, 62, 63, 65, 68.1, 69, 248/70, 72, 74.1, 74.3, 74.5; 446/128
See application file for complete search history.

(56) References Cited

U.S. PATENT DOCUMENTS

| | | | | |
|---|---|---|---|---|
| 1,858,101 A | * | 5/1932 | McAfee | F16L 7/00 248/49 |
| 5,230,496 A | * | 7/1993 | Shillington | A61M 5/1418 24/487 |
| 5,833,188 A | * | 11/1998 | Studdiford | B62J 11/00 248/229.17 |
| 6,669,151 B2 | * | 12/2003 | Mascadri | F16L 3/233 248/65 |
| 7,278,613 B2 | * | 10/2007 | Roy | F16L 3/02 248/49 |
| 7,441,731 B2 | * | 10/2008 | Smart | F16L 3/02 248/68.1 |

(Continued)

FOREIGN PATENT DOCUMENTS

| KR | 100715224 | 4/2007 |
|---|---|---|
| KR | 100721852 | 5/2007 |
| KR | 20100081513 | 7/2010 |

OTHER PUBLICATIONS

International Search Report and Written Opinion corresponding to International Application No. PCT/US2019/029130 dated Sep. 11, 2019.

*Primary Examiner* — Terrell L Mckinnon
*Assistant Examiner* — Michael McDuffie
(74) *Attorney, Agent, or Firm* — Myers Bigel, P.A.

(57) ABSTRACT

An adapter for mounting cable hangers includes: a floor, a ceiling and side walls that span the floor and ceiling, wherein the ceiling includes a mounting hole; and a cross-member that extends between the side walls that defines at least one window between the cross-member, the floor and one of the side walls.

16 Claims, 4 Drawing Sheets

(56) References Cited

U.S. PATENT DOCUMENTS

| | | | |
|---|---|---|---|
| 7,571,880 B2* | 8/2009 | Perez | F01N 13/1822 |
| | | | 248/58 |
| 7,947,078 B2* | 5/2011 | Siegal | A61F 2/4611 |
| | | | 623/17.11 |
| 8,011,621 B2* | 9/2011 | Korczak | F16L 3/127 |
| | | | 248/68.1 |
| 8,439,316 B2* | 5/2013 | Feige | F16L 3/13 |
| | | | 248/71 |
| 8,851,430 B2* | 10/2014 | Mulzer | A61J 1/16 |
| | | | 248/65 |
| 9,853,434 B2 | 12/2017 | Vaccaro | |
| 9,866,004 B2 | 1/2018 | Vaccaro et al. | |
| 9,903,510 B2 | 2/2018 | Joshi et al. | |
| 10,253,906 B2 | 4/2019 | Vaccaro | |
| 10,415,723 B2* | 9/2019 | Vaccaro | F16L 3/00 |
| D890,182 S * | 7/2020 | Bell | D14/433 |
| 2004/0206545 A1* | 10/2004 | Tracy | F16L 3/137 |
| | | | 174/135 |
| 2005/0173597 A1* | 8/2005 | Farrell | F16L 3/22 |
| | | | 248/68.1 |
| 2006/0249633 A1 | 11/2006 | Korczak et al. | |
| 2007/0045482 A1* | 3/2007 | Smart | F16L 3/04 |
| | | | 248/68.1 |
| 2009/0050753 A1* | 2/2009 | Gabriel | H02G 3/32 |
| | | | 248/49 |
| 2010/0108825 A1* | 5/2010 | Brock | F16L 1/06 |
| | | | 248/73 |
| 2011/0006168 A1* | 1/2011 | Pallitto | F16L 3/1207 |
| | | | 248/49 |
| 2011/0126934 A1* | 6/2011 | Thuesen | F16L 3/1058 |
| | | | 138/106 |
| 2011/0283515 A1 | 11/2011 | Korczak | |
| 2013/0206928 A1* | 8/2013 | Murakoshi | B60R 16/0215 |
| | | | 248/73 |
| 2015/0001351 A1* | 1/2015 | Krager | H02G 3/32 |
| | | | 248/49 |
| 2015/0129726 A1* | 5/2015 | Sherman | H02G 3/30 |
| | | | 248/68.1 |
| 2016/0009469 A1* | 1/2016 | Schneider De Oliveira | F16L 55/04 |
| | | | 248/636 |

* cited by examiner

ADAPTER FOR MOUNTING CABLE HANGERS

RELATED APPLICATION

The present application claims priority from and the benefit of U.S. Provisional Patent Application No. 62/686,882, filed Jun. 19, 2018, the disclosure of which is hereby incorporated herein by reference in its entirety.

FIELD OF THE INVENTION

The present invention relates generally to devices for supporting cables and, in particular, to hangers for securing cables to support structures.

BACKGROUND OF THE INVENTION

Cable hangers are commonly used to secure cables to structural members of antenna towers and/or along tunnel walls. Generally, each cable is attached to a structural member by cable hangers mounted at periodically-spaced attachment points.

Antenna towers and/or tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable-type cable hangers significantly increase the number of cables mountable to a single attachment point.

One popular stackable cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the arms to engage the cable. The locking projections of a hanger are inserted into a hole in the antenna tower (typically in the leg of the antenna tower) to secure the hanger to the tower. Hangers can be "stacked" onto each other by inserting the locking projections of one hanger into the large aperture of the next hanger. One variety of cable hanger of this type is the SNAP-STAK® hanger, available from CommScope, Inc. (Joliet, Ill.). Other cable hangers are shown in U.S. Pat. No. 9,866,004, issued Jan. 4, 2018, U.S. Pat. No. 9,853,434, issued Dec. 26, 2017, and U.S. Pat. No. 9,903,510, issued Feb. 27, 2018, the disclosures of each of which are hereby incorporated herein by reference in full.

In some instances, it may be desirable to mount multiple stacks of cable hangers in close proximity. In such instances, it may be desirable to employ an adapter, such as that shown at 10 in FIG. 1. The adapter 10 has a trapezoidal profile, with a base panel 12 and three serially-attached mounting panels 14. Each of the mounting panels 14 includes a mounting hole 16 (typically a nominal ¾ inch hole) that can receive a cable hanger such as those described above, one of which is designated 20 in FIG. 2. The base panel 12 of the adapter 10 has a hole 18 that can be used to mount the adapter 10 to a mounting structure via a bolt. The base panel 12 also includes slots 22 on either side of the hole 18 that can receive a hose clamp 26 or the like to mount the adapter 10 to a pole 24, as shown in FIG. 3. This mounting approach may be desirable when the pole 24 has no pre-formed holes to receive a typical cable hanger.

Areas near cellular antennas (i.e., within 1λ, or one wavelength) can be (relatively) high radio frequency (RF) energy environments. Conductive items in these areas, such as hangers and other hardware, can generate undesirable passive intermodulation (PIM). Typical examples of potential PIM-generating conditions include the combination of steel-on-steel contact (between two or more components), plus low contact pressure and/or relative movement between the steel components at the joint. As such, it may be desirable to provide solutions for hanging cables with reduced (or eliminated) likelihood of PIM generation.

SUMMARY

As a first aspect, embodiments of the invention are directed to an adapter for mounting cable hangers. The adapter comprises a floor, a ceiling and side walls that span the floor and ceiling, wherein the ceiling includes a mounting hole. The adapter further comprises a cross-member that extends between the side walls that defines at least one window between the cross-member, the floor and one of the side walls.

As a second aspect, embodiments of the invention are directed to an assembly comprising a mounting structure; first and second adapters as described above, a first radial clamp routed through the window of the first adapter and the window of the second adapter. The first radial clamp secures the first and second adapters to the mounting structure.

As a third aspect, embodiments of the invention are directed to an adapter for mounting cable hangers comprising: a floor; a ceiling; and side walls that span the floor and ceiling. The ceiling includes a mounting hole. The adapter further includes means to affix the adapter to a mounting structure.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
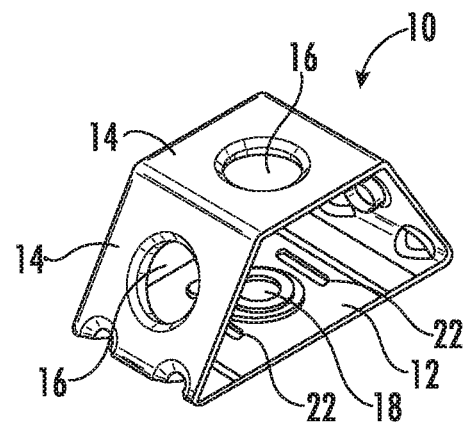
FIG. 1 is a perspective view of a prior art adapter for cable hangers.
Figure 2:
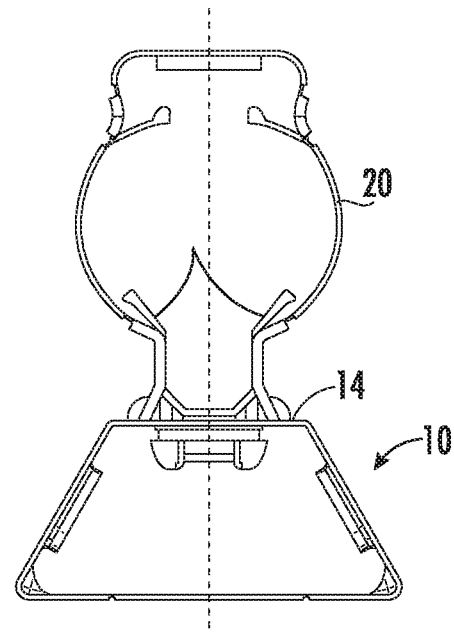
FIG. 2 is a top view of the adapter of FIG. 1 with a cable hanger mounted therein.
Figure 3:
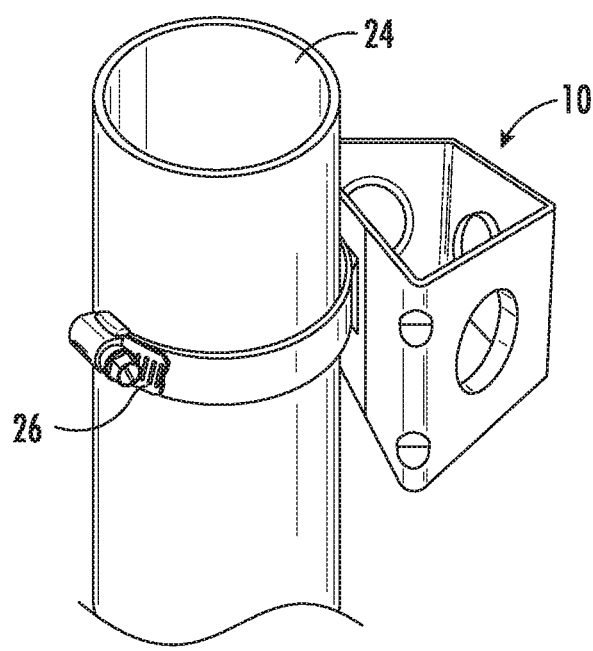
FIG. 3 is a perspective view of the adapter of FIG. 1 mounted to a pole via a hose clamp.
Figure 4:
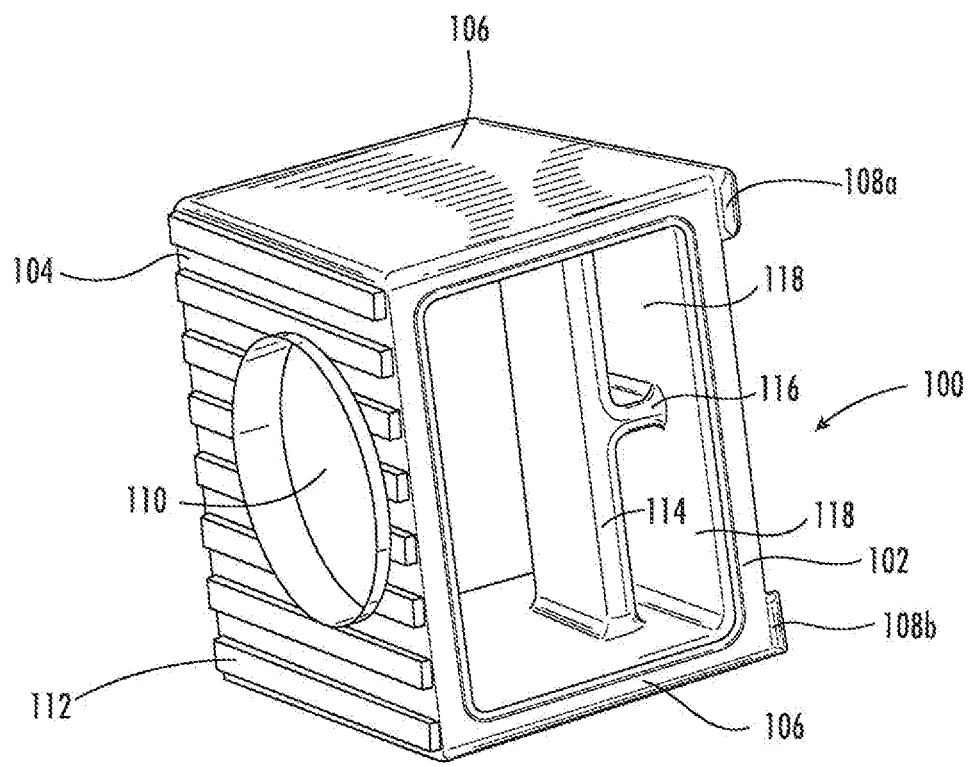
FIG. 4 is a front perspective view of an adapter for cable hangers according to embodiments of the invention.
Figure 5:
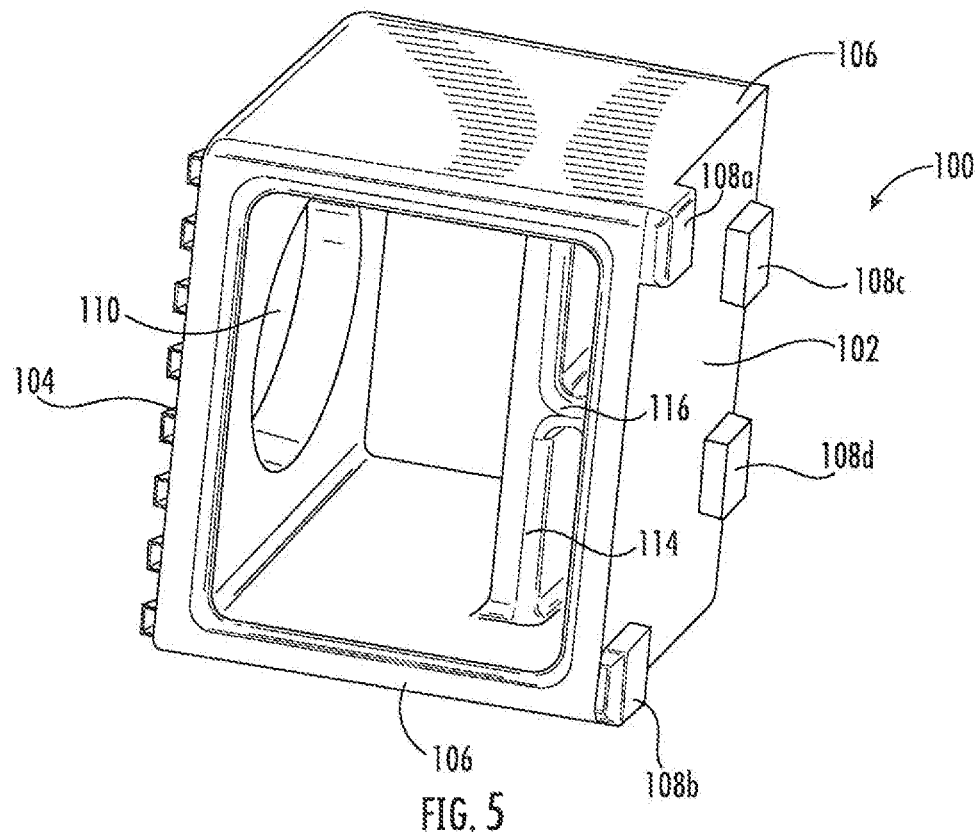
FIG. 5 is a rear perspective view of the adapter of FIG. 4.
Figure 6:
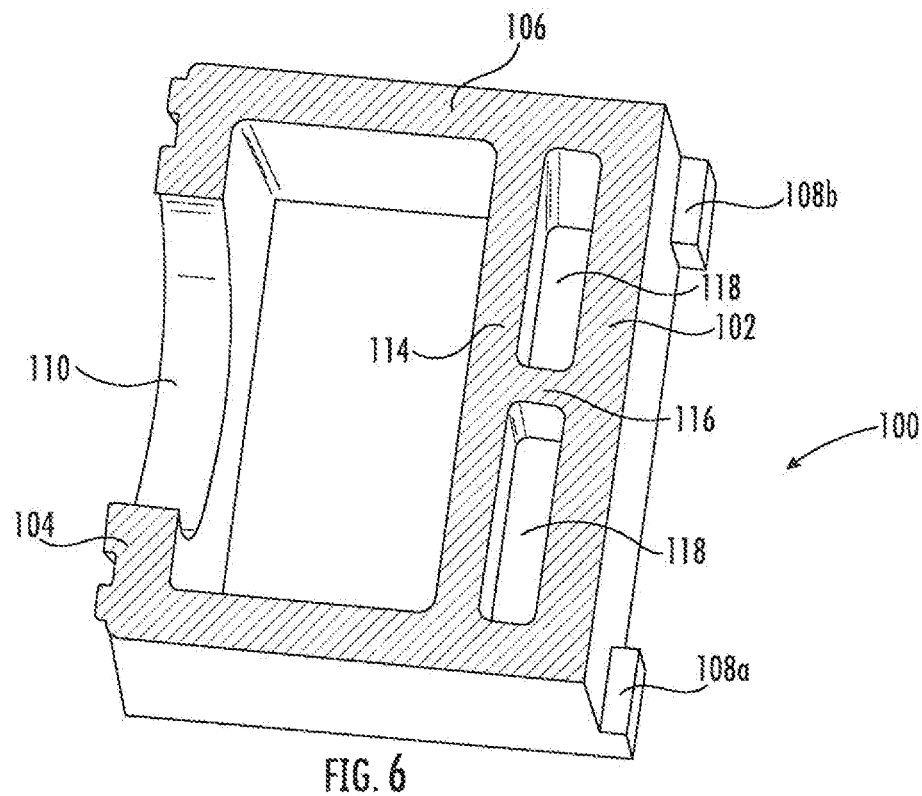
FIG. 6 is a perspective section view of the adapter of FIG. 4.

Referring now to FIGS. 4-7, an adapter for mounting cable hangers, designated broadly at 100, is shown therein. The adapter 100 includes a floor 102, a ceiling 104 opposite the floor 102, and two side walls 106 that span the floor and the ceiling 104. As can be seen in FIG. 5, the floor 102 is narrower in width than the ceiling 104, such that each of the side walls 106 defines a trapezoidal or "wedge" shape. Four feet 108a-108d extend from the floor 102; in the illustrated embodiment, the feet 108a, 108b are located at two of the corners of the floor 102, whereas the feet 108c, 108d are located on the opposite edge from the feet 108a, 108b but are offset somewhat from the side walls 106 (in other embodiments, all four feet 108a-d may be located at the four corners of the floor 102). As shown in FIG. 4, the ceiling 104 includes a central hole 110; in some embodiments, the hole 110 is nominally ¾ inch in diameter, and thus is sized for the insertion of cables hangers such as that shown at 20 in FIG. 2. Parallel reinforcing ribs 112 are also present on the ceiling 104.

The adapter 100 also includes a cross-member 114 that extends between the side walls 106 near the floor 102. A divider 116 extends between the cross-member 114 and the floor 102. The floor 102, cross-member 114 and divider 116 create two windows 118.

In some embodiments, the adapter 100 is formed of a polymeric material, such as acetal, polyethylene, polypropylene, PVC, or the like. The adapter 100 may be formed by injection molding. In the illustrated embodiment, the positioning of the feet 108a-d and the orientation of the ribs 112 and the windows 118 can enable the injection molding of the adapter 100 with a simple reciprocating mold that requires no "side-action" mechanism.

Figure 7:
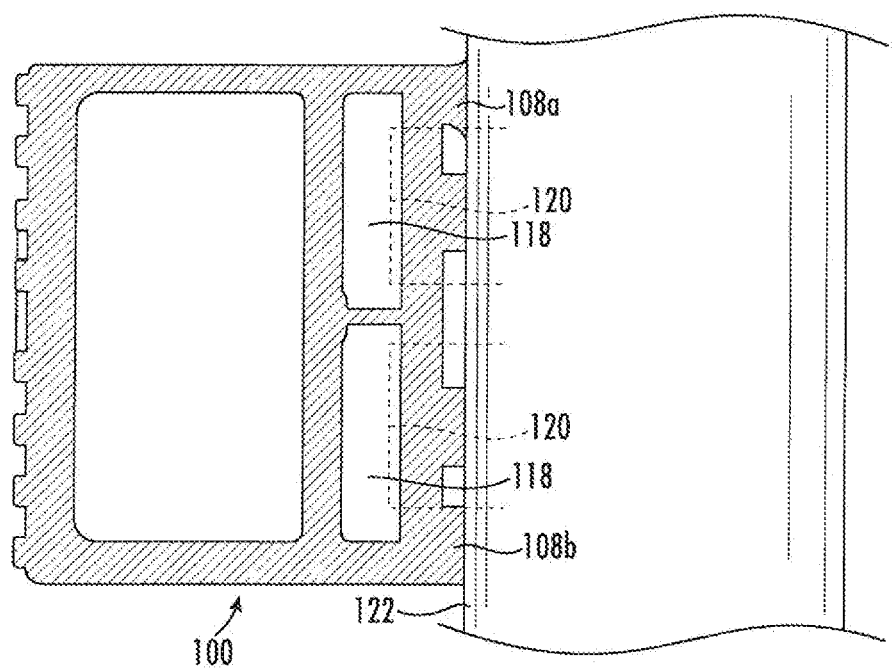
FIG. 7 is a side view of the adapter of FIG. 4 mounted to a mounting structure via two hose clamps.

As can be seen in FIG. 7, the windows 118 serve as receptacles for hose clamps 120 or other fastening devices, such as other radial clamping devices like straps, cable ties, and twist ties, clips and the like. The two hose clamps 120 shown in FIG. 7 are routed through respective windows 118 and around a mounting structure, such as a post 122 of an antenna mount, a monopole, or the like. The feet 108a-d contact the surface of the mounting structure 122 to provide a more stable foundation for the adapter 100. Once mounted on the mounting structure, the adapter 100 is positioned to serve as a mounting point (via the central hole 110) for a cable hanger, such as that shown in FIG. 2. Adapters 100 formed of a polymeric material can be used to mount a metallic cable hanger without creating a potential site of undesirable PIM. Of course, those skilled in this art will appreciate that the polymeric cables hangers, such as those described in U.S. Pat. No. 10,253,906, issued Apr. 9, 2019 (incorporated by reference in full herein), may also be employed.

Figure 8:
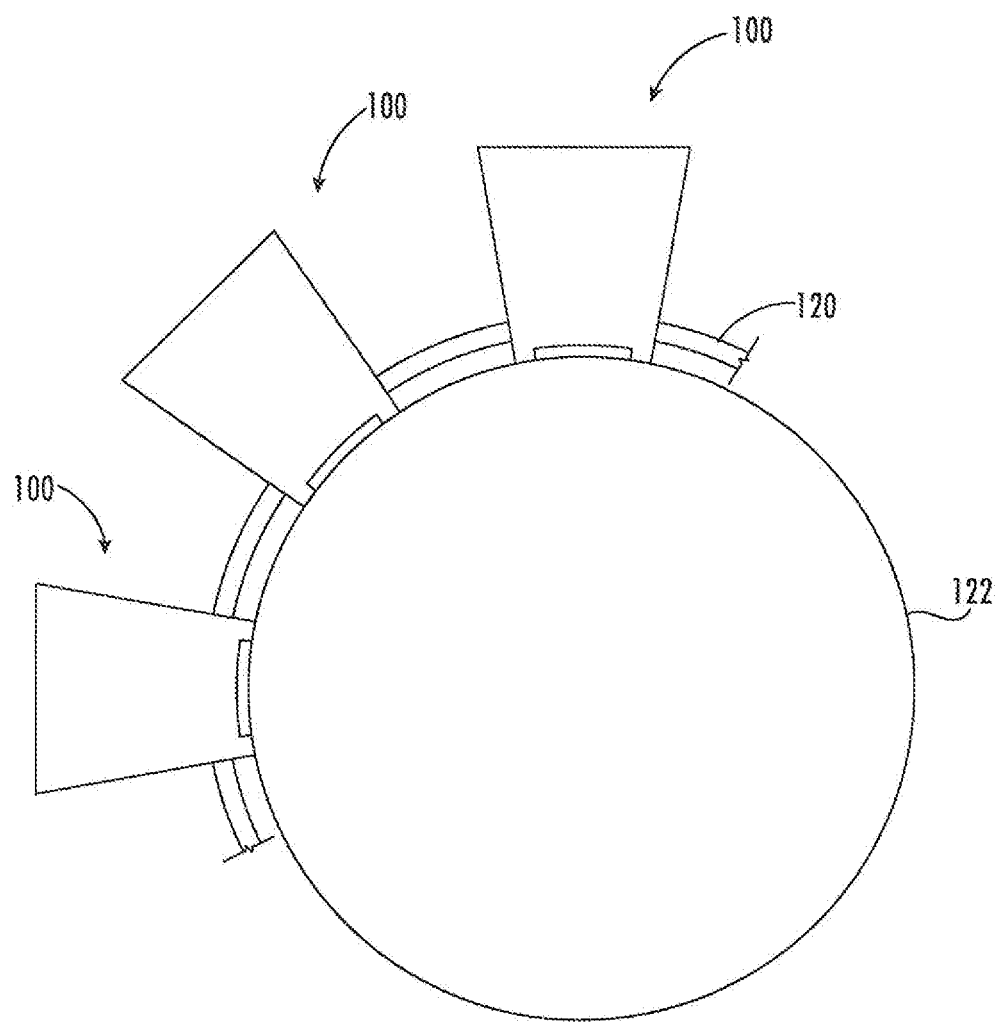
FIG. 8 is a schematic top view of three adapters of FIG. 4 mounted to a mounting structure with a common hose clamp.

As shown in FIG. 8, multiple adapters 100 can be mounted at the same elevation with a single hose clamp 120 (or pair of hose clamps 120). Each of the hose clamps 120 is simply routed through one of the windows 118 of each adapter 100 and secured around the mounting structure 122. The trapezoidal profile of the adapter 100 can help to increase of maximize the number of adapters 100 placed side-by-side around the mounting structure 100.

It will also be appreciated that the adapter 100 may be configured such that the side walls 106 may include holes for mounting a cable hanger. Further, in some embodiments, the "open" sides of the adapter 100 may be at least partially closed with side walls, which side walls may include holes for mounting additional cable hangers.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An adapter for mounting cable hangers, comprising:
    a floor, a ceiling and side walls that span the floor and ceiling, wherein the ceiling includes a mounting hole; and
    a cross-member that extends between the side walls that defines a window and an upper opening through open sides of the adapter, where the window is located between the cross-member, the floor and one of the side walls, and the upper opening is located between the cross-member, the ceiling and the side walls; and
    wherein the floor is narrower in width than the ceiling, such that the ceiling, floor and side walls define a trapezoidal shape.

2. The adapter defined in claim 1, further comprising a divider that extends between the floor and the cross-member to define a second window.

3. The adapter defined in claim 1, formed of a polymeric material.

4. The adapter defined in claim 1, wherein the mounting hole has a nominal diameter of ¾ inch.

5. The adapter defined in claim 1, in combination with a radial clamp routed through the window and the open sides of the adapter.

6. The combination defined in claim 5, wherein the radial clamp is secured to a mounting structure, such that the clamp is perpendicular to a longitudinal axis of the structure.

7. The adapter defined in claim 1, further comprising a cable hanger mounted to the mounting hole.

8. The adapter defined in claim 7, further comprising a cable mounted in the cable hanger.

9. An assembly, comprising:
    a mounting structure;
    first and second adapters as defined in claim 1;
    a radial clamp routed through the window of the first adapter and the window of the second adapter, the radial clamp securing the first and second adapters to the mounting structure, such that the adapters are mounted at the same elevation relative to the mounting structure.

10. The assembly defined in claim 9, wherein the mounting structure is a post of an antenna mount.

11. The assembly defined in claim 9, wherein the mounting structure is a monopole.

12. The assembly defined in claim 9, wherein the first and second adapters are formed of a polymeric material.

13. The assembly defined in claim 9, further comprising first and second cable hangers mounted, respectively, in the holes of the first and second adapters.

14. The assembly defined in claim 13, further comprising first and second cables mounted, respectively, in the first and second cable hangers.

15. The assembly defined in claim 9, wherein each of the first and second adapters further comprises a divider that extends between the floor and the cross-member to define a second window, and wherein the assembly further comprises a second radial clamp that is routed through the second windows of the first and second adapters.

16. An assembly, comprising:
a mounting structure;
first and second adapters comprising;
   a floor, a ceiling and side walls that span the floor and ceiling, wherein the ceiling includes a mounting hole; and
   a cross-member that extends between the side walls that defines a window and an upper opening through open sides of the adapter, where the window is located between the cross-member, the floor and one of the side walls, and the upper opening is located between the cross-member, the ceiling and the side walls;
a first radial clamp routed through the window of the first adapter and the window of the second adapter to securing the first and second adapters to the mounting structure.

* * * * *